Patented Oct. 2, 1945

2,385,853

UNITED STATES PATENT OFFICE 2,385,853

PROCESSES FOR PRODUCING HORMONES

Stockton G. Turnbull, Jr., Wilmington, Del., assignor to E. I. du Pont de Nemours & Company, Wilmington, Del., a corporation of Delaware No Drawing. Application August 17, 1943, Serial No. 498,984

2 Claims. (Cl. 260—619)

This invention relates to new and inexpensive processes for producing hormones and in particular synthetic estrogens.

It is an object of this invention to produce hormones by means of a new and relatively inexpensive process. A further object is to produce synthetic estrogens by a simple and easily controlled process. A still further object is to produce hormones by a process which avoids many of the disadvantages of the prior art processes. Additional objects will become apparent from a consideration of the following description and claims.

These objects are attained in accordance with the hereinafter described invention wherein a compound having the following general formula is subjected to the addition of halogen-removing agents:

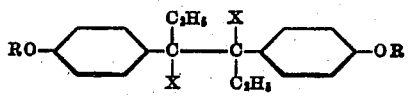

wherein R is hydrogen, an alkyl or an acyl group, and X is a halogen atom. In a more restricted sense this invention is concerned with the treatment with halogen-removing agents of a compound having the above general formula wherein R represents either an alkyl or an acyl radical. In a still more restricted sense this invention pertains to the dehalogenation of compounds of the aforesaid type. In a still more restricted sense this invention is concerned with the dehydrohalogenation of the foregoing and related compounds. In its preferred embodiment this invention is directed to the production of a 3,4-di-(p-hydroxy-phenyl)-hexadiene-2,4 by dehydrobrominating with a hydrogen bromide acceptor a compound having the following general formula:

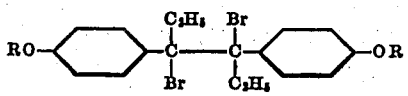

wherein R is hydrogen, an alkyl or an acyl group. This invention is also concerned with new compounds and the employment of these and related products in the production of pharmaceutical materials.

The invention may be more readily understood by a consideration of the following illustrative examples wherein the quantities are stated in parts by weight.

EXAMPLE 1

*3,4-di-(p-anisyl)-3,4-dibromohexane*

A solution of 8.9 parts of hexestrol dimethyl ether in 100 parts by volume of carbon tetrachloride was heated to 65° C. and approximately 0.025 part of benzoyl peroxide was added. While irradiating the solution with actinic light from a 150-watt projector flood lamp, a solution of 9.6 parts of bromine in 50 parts by volume of carbon tetrachloride was added dropwise over 3.5 hours in such a way that the heat evolved in the reaction maintained the reaction mixture at a gentle reflux. Hydrogen bromide was evolved. The pale yellow solution was then cooled and extracted twice with 5% sodium sulfite and was then dried over sodium sulfate and concentrated under vacuum. The 20 parts of oil and crystals thus obtained was slurried in cold acetone which gave 7 parts of white crystals. Upon recrystallization from ethyl acetate the 3,4-di-(p-anisyl)-3,4-dibromohexane was obtained as white crystals that darkened slightly at 115° C. and melted sharply with decomposition at 119–121° C. with the evolution of hydrogen bromide and the formation of a blue-green liquid.

Calc. for $C_{20}H_{24}O_2Br_2$: C, 52.62; H, 5.30; Br, 35.1
Found: C, 52.57; H, 5.17; Br, 35.2

EXAMPLE 2

*3,4-di-(p-anisyl)-3,4-dibromohexane*

To 8 parts of the dimethyl ether of trans-diethyl stilbestrol in 100 parts by volume of carbon bisulfide there was added dropwise at 0–5° C. over 4.5 hours a solution of 4.52 parts of bromine in 45.2 parts by volume of carbon bisulfide. The 2.8 parts of 3,4-di-(p-anisyl)-3,4-dibromohexane that crystallized had the same behavior on melting as that obtained by the method of Example 1. By concentration of the carbon bisulfide solution, another 3.9 parts of this product was isolated.

EXAMPLE 3

*Diacetate of 3,4-di-(p-hydroxyphenyl)-3,4-dibromohexane*

To a solution of 7.04 parts of diethyl stilbestrol diacetate in 150 parts by volume of carbon bisulfide there was added dropwise with agitation at 25° C. over 1.5 hours a solution of 3.36 parts of bromine in 20 parts by volume of carbon bisulfide. The bromine was only slowly absorbed and consequently was added quite slowly. After standing overnight, some crystals had deposited. All was dissolved in chloroform and the solvent mixture was removed under vacuo. The crystalline residue was treated with alcohol, which gave the crude 3,4-di-(p-hydroxyphenyl)-3,4-dibromohexane diacetate. Upon purification with ethyl acetate the pure product was obtained. It melted sharply at 156–156.5° C. with the evolution of gas.

Calc. for $C_{22}H_{24}O_4Br_2$: C, 51.55; H, 4.73; Br, 31.20
Found: C, 51.60; H, 4.76; Br, 31.42

Bromination in glacial acetic acid gave the same product. The rate of bromination in acetic acid was more rapid than in carbon bisulfide, but the product was more stable in the latter solvent.

Bromination of hexestrol diacetate in carbon tetrachloride under the conditions of Example 1 gave the same diacetate of 3,4-di-(p-hydroxyphenyl)-3,4-dibromohexane.

EXAMPLE 4

To 0.50 part of the dibromo product of Example 3 in 50 parts of alcohol there was added a solution of 2 parts of potassium iodide in 50 parts of alcohol. The solution was heated at reflux for an hour, and was then poured into water. The product was extracted into ether which was washed with dilute $Na_2SO_3$ and water. After drying and concentration, 0.16 part of crystalline product was obtained from alcohol. After two recrystallizations from alcohol, it melted at 117–119° C. The melting point when mixed with authentic transdiethyl stilbestrol diacetate of melting point 121–123° C. was 107–108° C.

Calc. for 3,4-di-(p-hydroxyphenyl)-hexadiene-2,4-diacetate: C, 75.4; H, 6.3
Found: C, 75.2; H, 6.5

The mother liquors from the crystallizations above were joined and freed of solvent. After saponification by heating at reflux in 5% methanolic potassium hydroxide for 0.5 hour, there was obtained 0.08 part of white crystals that melted at 220–223° C. when crystallized from ethylene dichloride. It corresponds to the 3,4-di-(p-hydroxy-phenyl)-hexadiene-2,4 described by Dodds as melting at 227–228° C. The latter is an estrogen comparable in activity to diethyl stilbestrol.

EXAMPLE 5

When 1 part of the dibromo compound of Example 3 was heated with 40 parts by volume of dry pyridine under nitrogen, there was obtained the diacetate of 3,4-di-(p-hydroxyphenyl)-hexadiene-2,4 described in Example 4.

EXAMPLE 6

2.5 parts of the crystalline 3,4-di-(p-hydroxyphenyl)-3,4-dibromohexane diacetate obtained in Example 3 was agitated in a solution of 100 parts by volume of alcohol with 10 parts of zinc dust at 25° C. for 20 hours. After filtration from zinc dust and concentration, a green oil was obtained that was crystallized from benzene to yield a compound of melting point 141–142° C. saponification of the acetate groups had occurred. Upon esterification with acetic anhydride in pyridine the cisdiethyl stilbestrol diacetate was apparently obtained. The compound of M. P. 141–142° C. is apparently the mixture first reported by Dodds [Proc. Roy. Soc., 127B, 153 (1939)], who thought it to be an isomer of stilbestrol. It was later shown by Walton and Brownlee [Nature, 151, 306 (1943)] to be a eutectic mixture containing 60% psi-stilbestrol and 40% stilbestrol.

EXAMPLE 7

The mother liquor from the isolation of the material of melting point 156–156.5° C. described in Example 3 was concentrated to obtain the steroisomeric 3,4-di-(p-hydroxyphenyl)-3,4-dibromohexane diacetate, an oil. This was agitated in 100 parts of alcohol with 10 g. of zinc dust for 20 hours. After filtration and concentration, the oil obtained was dissolved in ether, which was extracted several times with dilute caustic. From the ether solution hexestrol diacetate was obtained by crystallization from alcohol, and the caustic washes on acidification, extraction into ether and crystallization from benzene and 50% ethanol gave hexestrol of melting point 184.5–187° C.

EXAMPLE 8

When the process of Example 1 was repeated using a trace of iodine as a catalyst rather than benzoyl peroxide, there was formed a new dibromo-3,4-di-(p-anisyl)-hexane in which the bromine atoms are attached to the benzene nuclei. In contrast to the product of Example 1, this material melted clear without signs of decomposition at 179–181° C., indicating the two bromine atoms to be firmly bound in the benzene nuclei.

Calc. for $C_{20}H_{24}O_2Br_2$: Br, 35.1
Found: Br, 33.4

EXAMPLE 9

When the 3,4-di-(p-anisyl)-3,4-dibromohexane of Example 1 was treated with potassium iodide in acetone or with zinc dust in alcohol, acetic acid, carbon tetrachloride or benzene, there was apparently formed in all cases hexestrol dimethyl ether. No explanation for this is readily apparent. Evidently reduction in addition to debromination occurred.

It is to be understood that the above examples are representative merely of a few of the many embodiments of this invention. They may be varied widely with respect to the individual reactants, the amounts thereof and the conditions of reaction without departing from the scope hereof.

The compounds which are subjected to treatment with halogen-removing agents, as previously mentioned, conform to the following general formula:

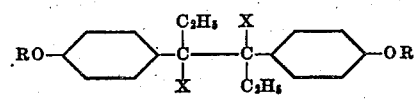

wherein R is hydrogen, an alkyl or an acyl group, and X is a halogen atom. In this formula R may represent practically any alkyl, aralkyl or acyl radical, among which may be mentioned ethyl, propyl, isopropyl, butyl, propionate, palmitate, laurate, stearate, benzoate, etc.

Numerous halogen-removing agents are known and described in the literature, and it is contemplated that any of them may be used in practicing this invention. For purposes of illustration a few of the many dehalogenating and dehydrohalogenating agents coming within this category may be mentioned. Dehalogenating agents are, in general, metals in solvents. For instance, metals such as sodium, calcium, and the like, may be used. Dehydrohalogenating agents or hydrogen halide acceptors are, for example, inorganic bases, inorganic salts, and organic amines, such as, for instance, metallic hydroxides, metallic oxides, metallic carbonates, pyridine, piperidine, trimethyl ammonium hydroxide, aniline, dimethyl aniline, quinoline, metallic salts of organic acids, such as sodium acetate, lead acetate, etc.

By means of the present invention a new and relatively inexpensive process for obtaining hormones has been made available. This process is of particular value in the production of synthetic estrogens, such as 3,4-di-(p-hydroxyphenyl)-hexadiene-2,4 and its diacetate. Likewise, synthetic estrogens of the same order of activity as diethyl stilbestrol have been attained.

As many widely different embodiments of this invention may be made without departing from the spirit and scope thereof, it is to be understood that the invention is not limited to the specific embodiments thereof except as defined in the appended claims.

I claim:

1. A process which comprises heating a diester of 3,4-di-(p-hydroxyphenyl)-3,4-dibromohexane with a solution of potassium iodide in alcohol, and then saponifying the resulting product.

2. A process which comprises heating the diacetate of 3,4-di-(p-hydroxyphenyl)-3,4-dibromohexane with a solution of potassium iodide in alcohol, and then saponifying the resulting product.

STOCKTON G. TURNBULL, Jr.